Nov. 17, 1959  J. C. MATCHETT  2,913,261
TUBE COUPLINGS

Filed July 16, 1957  2 Sheets-Sheet 1

INVENTOR.
John C. Matchett.
BY
ATTORNEY.

Nov. 17, 1959 J. C. MATCHETT 2,913,261
TUBE COUPLINGS
Filed July 16, 1957 2 Sheets-Sheet 2

INVENTOR.
John C. Matchett.
BY
ATTORNEY.

2,913,261
Patented Nov. 17, 1959

2,913,261
TUBE COUPLINGS

John C. Matchett, Lakewood, Calif., assignor, by mesne assignments, to William Perlman, Houston, Tex.

Application July 16, 1957, Serial No. 672,272

2 Claims. (Cl. 285—175)

This invention relates to tube couplings and more particularly to couplings having quick disconnect features.

An object of the invention is to facilitate connection between adjacent ends of fluid conveying tubes and pipes while providing adequate seal against leakage.

Another object of the invention is to insure rapid coupling and uncoupling by the use of one hand.

Another object of the invention is to simplify the joining and disjoining of adjacent pipe and tube ends by reducing the number of operations to a minimum.

Another object of the invention is to lock the associated connecting parts together with a simple device which can easily and rapidly be applied.

These and other objects and advantages derive from a preferred embodiment of the invention which includes a pair of exteriorly threaded elements secured to the pipe or tube ends respectively and upon which the coupling members are rotatable into abutting relation. The threads of each element run in opposite directions from each other so that rotation of the two coupling members as a unit in one direction serves to draw them together in coupled position. The members have alternately arranged or staggered lugs and lug spaces formed therein for conjoint operation to prevent relative rotation when brought into operative engagement. A locking ring is provided for insertion between flanges formed on the lugs to prevent separation of the parts. Sealing means is provided for the joint surfaces to prevent leakage after the coupling is made up.

Figure 1:
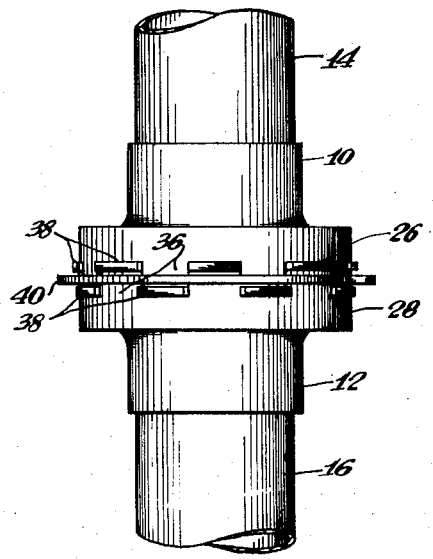
Fig. 1 is an elevation of the coupling in position on adjacent tube ends.
Figure 2:
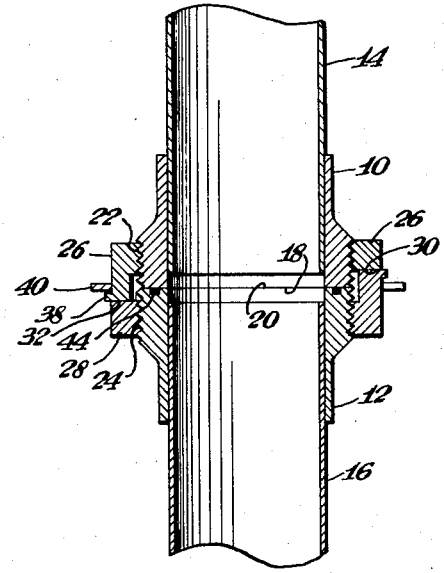
Fig. 2 is a longitudinal section of the coupling shown in Fig. 1.
Figure 3:
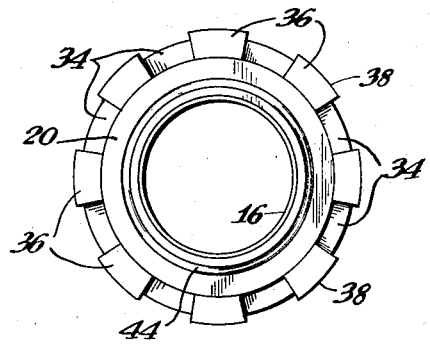
Fig. 3 is an end elevation of one portion of the coupling separated from the other.
Figure 4:
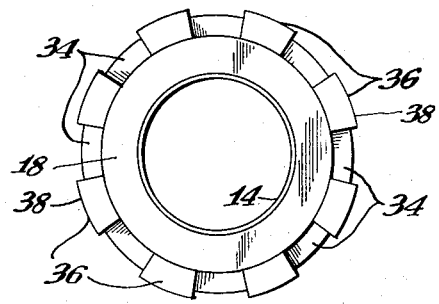
Fig. 4 is a similar end elevation of the other coupling portion.

Referring more particularly to the drawings, a pair of annular collar elements 10, 12 are shown as secured by welding or other suitable means to the adjacent ends of a pair of tubes or pipes 14, 16. The end faces 18, 20, respectively, of the collar elements 10, 12 project beyond the adjacent ends of the tubes or pipes 14, 16 and are adapted to be brought into abutting relation as will hereinafter be apparent. In order to reduce the weight of the coupling, the terminal ends of the collar elements 10, 12 opposite the end faces 18, 20 are reduced to substantially equal the wall thickness of the tubes or pipes 14, 16. The remaining portions of the collar elements 10, 12 are exteriorly threaded as at 22, 24, respectively, and the particular arrangement of the threads forms an important feature of this invention. Thus, the threads 22 on the collar element 10 are of opposite hand to the threads 24 on the collar element 12, that is the threads 22 may be right hand and the threads 24 left hand or vice versa. The purpose of such arrangement of the threads 22, 24 to run in opposite directions will become clearly apparent hereinafter.

A pair of cooperating annular members 26, 28, respectively, are interiorly threaded to operatively engage the threads 22, 24, respectively. Thus, the annular members 26, 28 have threads of opposite direction to correspond with the right and left hand threads 22, 24, respectively. It should be observed, therefore, that the annular member 26 will not under any circumstances threadedly engage the collar element 12 since the threads 24 thereon are of different hand. Likewise, the annular member 28 cannot threadedly engage the collar element 10 since the threads 22 thereon would prevent such engagement. Beyond the difference in threads, the two annular members 26, 28 may be identical in form as will be apparent as this description proceeds.

The opposite end faces 30, 32 of the annular members 26, 28, respectively, are each provided with a plurality of recesses 34 of substantially rectangular form and define a plurality of preferably rectangular-shaped lugs 36 on the end faces 30, 32, respectively. In this embodiment, eight such lugs 36 are formed on the end faces 30, 32 of the annular members 26, 28, respectively, although it will be apparent that any desired number may be employed. Since the annular members 26, 28 are similar in form, the spaces 34 on one member are adapted to receive the lugs 36 on the other member when the parts are brought into coupled relation. Such coupled or abutting relation between the members 26, 28 brings the lugs 36 of both members into staggered relation and provides the annular members 26, 28 with interfitting portions.

The lugs 36 adjacent the end faces 30, 32, respectively, have upstanding flanges 38 which form spaced alternately disposed segments on the annular members 26, 28 when in abutting relation. The segments so formed can be viewed in Fig. 1 as a pair of disconnected annular projections having an annular groove therebetween.

Figure 5:
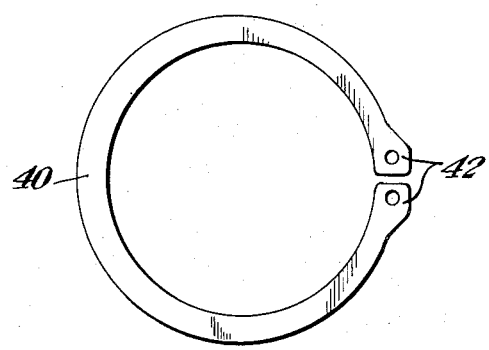
Fig. 5 is an end elevation of a detail.

In order to lock the two coupling halves formed on the collar elements 10, 12 and the annular members 26, 28, respectively, in coupled relation, a locking element is employed. This element, as shown more clearly in Fig. 5, is in the form of a split-ring 40 having a pair of oppositely disposed ears 42 adjacent the split. The ears 42 may be perforated for the reception of a lock wire or other securing means for preventing undesired separation and removal of the ring 40 from the coupling. The ring 40 is positioned in the annular space or groove formed between the oppositely disposed lugs 38 on the members 26, 28, respectively, when coupled and is adapted to engage the lugs 38 on opposite sides thereof. It will be apparent that separation of the two halves of the coupling is precluded when the locking ring 40 is in position.

To prevent leakage of fluid between the end faces 18, 20 of the collar elements 10, 12, respectively, suitable sealing means is employed. Thus, the end face 20 of the collar element 12 is provided with an annular groove for reception of an O-ring 44 of rubber or rubber-like material, Teflon, Kel-F, nylon, or other suitable material having the desired resiliency when compressed between the end surfaces 18, 20.

The coupling is made by bringing the collar elements 10, 12 together with the lugs 36 on the annular members 26, 28 fitted into the spaces 34 thereon. The locking ring 40 is sprung open sufficiently to be inserted in the groove formed between the lugs 38 and is then released to clamp the parts together. The two annular members 26, 28 may then be grasped by one hand of the operator and rotated as a unit in the same direction to cause the collar elements 10, 12 and their associated tubes or pipes 14, 16, respectively, to advance together. Such operation is due to the oppositely arranged threads 22, 24 and will cause the end faces 18, 20 to be sealed together in a leak-proof manner by the O-ring 44 as the coupling is tightened.

The coupling may easily and readily be disconnected into two halves by merely removing the locking ring 40 with pliers or other suitable tool and the coupling will then come apart by separation of the end faces 18, 20, the annular member 26 remaining threaded on collar element 10 while annular member 28 is retained on collar member 12.

It is apparent that the tube coupling herein shown and described utilizes only a few simple and inexpensive parts to provide a quick disconnect coupling which is compact and highly effective. It will further be apparent that many changes may be made in the details of construction and arrangement of parts without departure from the invention as defined in the appended claims.

I claim:

1. The combination of a fluid-tight joint and a quick disconnect coupling comprising a pair of tubular elements having oppositely disposed sealing surfaces on their adjacent ends, right hand threads on the exterior of one of said elements and left hand threads on the exterior of the other of said elements, a pair of annular coupling members, one for each tubular element and being threaded thereon, a plurality of spaced lugs projecting from one end of one of said coupling members, a plurality of spaced lugs projecting from one end of the other of said coupling members and interfitting with the lugs on said one coupling member to form a disconnected interlocking coupling unit, flange means upon each of said lugs, said flanges forming a continuous exterior annular groove when said lugs are in interfitting relation, split locking ring means disposed in the annular groove and locking said lugs in interfitting relation to form a connected interlocking coupling unit, contacting walls of said groove and ring meeting at less than the angle of friction therebetween, said interlocking coupling unit being rotated in one direction for moving the adjacent ends of said tubular elements toward each other whereby said surfaces thereon are moved into sealing engagement, and said locking ring means being completely removable from said annular groove for quickly disconnecting said coupling members from each other without removing the same from their respective tubular elements.

2. The combination of claim 1 wherein said flanges radiate outwardly from said lugs, and contacting walls of said flanges and ring are substantially parallel to one another and mutually normal to the axis of said interconnected coupling unit.

References Cited in the file of this patent

UNITED STATES PATENTS

| | | |
|---|---|---|
| 279,086 | Emery | June 5, 1883 |
| 435,800 | Connor | Sept. 2, 1890 |
| 1,263,252 | Jencick | Apr. 16, 1918 |
| 1,781,091 | Wilson | Nov. 11, 1930 |
| 2,018,455 | Lofton | Oct. 22, 1935 |
| 2,417,195 | Hargreaves | Mar. 11, 1947 |
| 2,438,107 | Babbitt | Mar. 23, 1948 |

FOREIGN PATENTS

| | | |
|---|---|---|
| 1,063,620 | France | Dec. 16, 1953 |
| 1,088,168 | France | Sept. 8, 1954 |